(12) United States Patent
Ryoo

(10) Patent No.: US 11,334,325 B2
(45) Date of Patent: May 17, 2022

(54) CODING TRAINING METHOD USING AUGMENTED REALITY

(71) Applicant: CODING & PLAY INC., Seoul (KR)

(72) Inventor: Kyung Hee Ryoo, Yongin-si (KR)

(73) Assignee: CODING & PLAY INC.

( * ) Notice: Subject to any disclaimer, the term of this patent is extended or adjusted under 35 U.S.C. 154(b) by 235 days.

(21) Appl. No.: 16/616,448

(22) PCT Filed: May 14, 2019

(86) PCT No.: PCT/KR2019/005793
§ 371 (c)(1),
(2) Date: Nov. 22, 2019

(87) PCT Pub. No.: WO2019/245166
PCT Pub. Date: Dec. 26, 2019

(65) Prior Publication Data
US 2021/0334077 A1 Oct. 28, 2021

(30) Foreign Application Priority Data
Jun. 20, 2018 (KR) .................. 10-2018-0071051

(51) Int. Cl.
G06F 8/34 (2018.01)
G06T 11/00 (2006.01)
G06T 19/00 (2011.01)

(52) U.S. Cl.
CPC ............... *G06F 8/34* (2013.01); *G06T 11/00* (2013.01); *G06T 19/006* (2013.01)

(58) Field of Classification Search
None
See application file for complete search history.

(56) References Cited

U.S. PATENT DOCUMENTS

| 2016/0005207 A1* | 1/2016 | Jeon | G06T 13/80 345/633 |
| 2018/0264652 A1* | 9/2018 | Tsuchiya | G09B 5/00 |
| 2021/0166459 A1* | 6/2021 | Miller, IV | G10L 15/14 |

FOREIGN PATENT DOCUMENTS

| KR | 20120130420 A | 12/2012 |
| KR | 20140010616 A | 1/2014 |

(Continued)

*Primary Examiner* — Yi Wang
(74) *Attorney, Agent, or Firm* — Renaissance IP Law Group LLP

(57) ABSTRACT

Provided is a coding training method using augmented reality as a method performed by a computing device including a camera, the coding training method including: a first step of obtaining coding training content; a second step of selecting one or more points included in the coding training content; a third step of obtaining an image photographed by the camera; a fourth step of recognizing the photographed image and matching one or more objects included in the photographed image with the one or more points; a fifth step of displaying an image and the matched one or more points; a sixth step of displaying a virtual robot on the photographed image; a seventh step of displaying one or more instruction blocks each including one or more instructions for controlling a movement of the virtual robot; an eighth step of arranging the one or more instruction blocks at the one or more points based on user input for the one or more instruction blocks displayed; a ninth step of controlling the virtual robot in order in which the one or more instruction blocks are arranged, moving the virtual robot along the one or more points, and performing instructions corresponding to the instruction blocks arranged at each point; and a tenth step of displaying the movement of the virtual robot according the control result.

5 Claims, 6 Drawing Sheets

(56) References Cited

FOREIGN PATENT DOCUMENTS

| KR | 20180007199 A | 1/2018 |
| KR | 20180037631 A | 4/2018 |
| KR | 20180055207 A | 5/2018 |

* cited by examiner

CODING TRAINING METHOD USING AUGMENTED REALITY

BACKGROUND

Technical Field

The present inventive concept relates to a coding training method using augmented reality.

Related Art

As an interest in coding training has increased, applications and services are being provided which enable beginners, children, and adolescents to learn coding by providing the beginners, children, and adolescents with a set of block-type commands and arranging the set of block-type commands rather than allowing the beginners, children, and adolescents to directly deal with programming languages. In addition, a learning service using a robot operating according to coding is provided so as to visually display a coding result and arouse an interest.

Augmented reality is a technology of superimposing virtual objects on the real world and displaying the superimposed image. The augmented reality is called mixed reality (MR) because it is a technology of combining a virtual world having additional information with the real world in real time and displays the combined world as one image.

SUMMARY

The present inventive concept provides a coding training method using augmented reality.

The technical objects of the present inventive concept are not limited to the above-mentioned technical objects, and other technical objects that are not mentioned will be clearly understood by those skilled in the art through the following descriptions.

In an aspect, a method performed by a computing device including a camera includes: a first step of obtaining coding training content; a second step of selecting one or more points included in the coding training content; a third step of obtaining an image photographed by the camera; a fourth step of recognizing the photographed image and matching one or more objects included in the photographed image with the one or more points; a fifth step of displaying an image and the matched one or more points; a sixth step of displaying a virtual robot on the photographed image; a seventh step of displaying one or more instruction blocks each including one or more instructions for controlling a movement of the virtual robot; an eighth step of arranging the one or more instruction blocks at the one or more points based on user input for the one or more instruction blocks displayed; a ninth step of controlling the virtual robot in order in which the one or more instruction blocks are arranged, moving the virtual robot along the one or more points, and performing instructions corresponding to the instruction blocks arranged at each point; and a tenth step of displaying the movement of the virtual robot according the control result.

DESCRIPTION OF EXEMPLARY EMBODIMENTS

Figure 1:
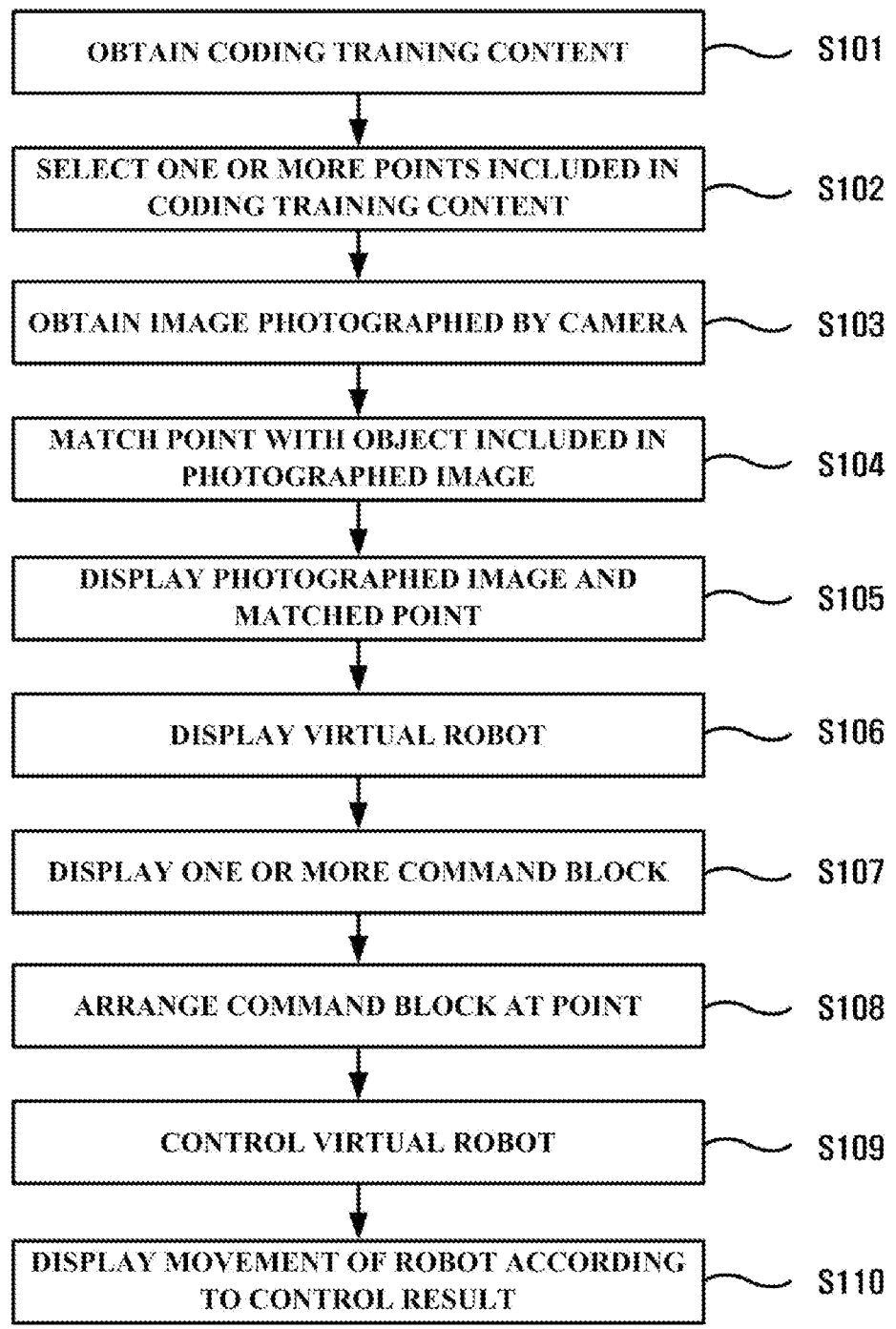
FIG. 1 is a flowchart illustrating a coding training method using augmented reality according to an embodiment.

According to an aspect of the present inventive concept for solving the above problems, a method performed by a computing device including a camera includes: a first step of obtaining coding training content; a second step of selecting one or more points included in the coding training content; a third step of obtaining an image photographed by the camera; a fourth step of recognizing the photographed image and matching one or more objects included in the photographed image with the one or more points; a fifth step of displaying the photographed image and the matched one or more points; a sixth step of displaying a virtual robot on the photographed image; a seventh step of displaying one or more command blocks each including one or more commands for controlling a movement of the virtual robot; an eighth step of arranging the one or more command blocks at the one or more points based on user input for the one or more command blocks displayed; a ninth step of controlling the virtual robot in order in which the one or more command blocks are arranged, moving the virtual robot along the one or more points, and performing command corresponding to the command block arranged at each point; and a tenth step of displaying the movement of the virtual robot according the control result.

In addition, the first step may include an eleventh step of obtaining a mission included in the coding training content and a twelfth step of displaying the mission, and the ninth step may include a thirteenth step of determining whether or not the mission is achieved according to the control result and a fourteenth step of displaying feedback according to whether or not the mission is achieved.

The thirteenth step may include a fifteenth step of determining the interaction between the one or more object and the virtual robot and a sixteenth step of determination whether or not the mission is achieved at each of the one or more points based on the interaction, and the fourteenth step may include a seventeenth step of displaying the feedback according to whether or not the mission is achieved at each of the one or more points.

In addition, the fifteenth step may include an eighteenth step of determining one or more contact points between the one or more object and the virtual robot, a nineteenth step of determining portions of the one or more objects and the virtual robot corresponding to each of the one or more contact points, and a twentieth step of determining the interaction based on positions and movement of the one or more contact points and the portions corresponding to each of the one or more contact points.

In addition, the twentieth step may include a twenty-first step of dividing a first contact point included in the one or more contact point into a second contact point and a third contact point, a twenty-second step of tracking movement of the second contact point and the third contact point, a twenty-third step of determining the portions of the one or more objects and the virtual robot corresponding to the second contact point and the third contact point, respectively, when a distance between the second contact point and the third contact point is greater than a predetermined reference value, and a twenty-fourth step of determining the interaction based on the positions and the movement of the second contact point and the third contact point and the portions corresponding to the second contact point and the third contact point, respectively.

In addition, the eleventh step may include a twenty-fifth step of determining a type of the one or more objects, a twenty-sixth step of generating a moving route of the virtual robot based on the positions and the type of the one or more objects included in the photographed image, a twenty-seventh step of obtaining a first mission which causes the virtual robot to move along the moving route, and a twenty-eighth step of obtaining a second mission which causes the virtual robot to perform at least one of the one or more objects with a predetermined interaction.

In addition, the eleventh step may include a twenty-ninth of generating and displaying one or more virtual objects on the moving route, a thirtieth step of determining a type of the one or more virtual objects, a thirtieth-first step of updating the moving route based on the position and type of the one or more virtual objects, a thirtieth-two of obtaining a third mission which causes the virtual robot to move along the updated moving route, and a thirtieth-third step of obtaining a fourth mission which causes the virtual robot to perform a predetermined interaction with at least one of the one or more virtual objects.

In addition, the eighth step may further include a thirtieth-fourth step of arranging at least a part of the one or more command blocks in the virtual robot, and the ninth step may further include a thirtieth-fifth step of performing command corresponding to the command block arranged on the virtual robot, a thirtieth-sixth step of performing command corresponding to the command block arranged at the reached point when the virtual robot reaches the one or more points, and a thirtieth-seventh of stopping an operation of the virtual robot and displaying the feedback when the command corresponding to the command block arranged on the virtual robot collide with the command corresponding to the command block arranged at the reached point.

Other specific details of the invention are contained in the detailed description and drawings.

Various advantages and features of the present disclosure and methods accomplishing them will become apparent from the following description of embodiments with reference to the accompanying drawings. However, the present inventive concept is not limited to the embodiments disclosed herein, but will be implemented in various forms. The embodiments make disclosure of the present inventive concept thorough and are provided so that those skilled in the art can easily understand the scope of the present inventive concept. Therefore, the present inventive concept will be defined by the scope of the appended claims.

Terms used in the present specification are for explaining the embodiments rather than limiting the present inventive concept. In the present disclosure, a singular form includes a plural form unless explicitly described to the contrary. Throughout this specification, the term "comprise" and/or "comprising" will be understood to imply the inclusion of stated constituents but not the exclusion of any other constituents. Like reference numerals refer to like elements throughout the specification and "and/or" includes each of the components mentioned and includes all combinations thereof. Although "first", "second" and the like are used to describe various components, it goes without saying that these components are not limited by these terms. These terms are used only to distinguish one component from other components. Therefore, it goes without saying that the first component mentioned below may be the second component within the technical scope of the present inventive concept.

Unless defined otherwise, all terms (including technical and scientific terms) used in the present specification have the same meaning as meanings commonly understood by those skilled in the art to which the present inventive concept pertains. In addition, terms defined in commonly used dictionary are not ideally or excessively interpreted unless explicitly defined otherwise.

Further, the term "~unit" or "module" used herein means a hardware component such as software, FPGA, or ASIC and performs predetermined functions. However, the term "~unit" or "module" is not meant to be limited to software or hardware. The "unit" or "module" may be configured to be stored in a storage medium that can be addressed or may be configured to regenerate one or more processors. Accordingly, for example, the "unit" or "module" includes components such as software components, object-oriented software components, class components, and task components, processors, functions, attributes, procedures, subroutines, segments of a program code, drivers, firmware, a microcode, a circuit, data, a database, data structures, tables, arrays, and variables. Functions provided in components, and the "units" or "modules" may be combined into fewer components, and "units" or "modules" or further separated into additional components, and "units" or "modules".

The spatially relative terms "below", "beneath", "lower", "above", "upper", and the like may be used to easily describe the correlation between one component and other components as illustrated in the drawings. The spatially relative terms should be understood as including different directions of components during use or operation in addition to the directions illustrated in the drawings. For example, when components illustrated in the drawings are inverted, a component described as "below" or "beneath" of another component may be disposed "above" another component. Therefore, the illustrative term "below" can include both downward and upward directions. The components can also be aligned in different directions, and therefore the spatially relative terms can be interpreted according to the alignment.

The numbers (for example, the first step, the second step and the like) described along with each step described herein are for distinguishing each step, and are not for specifying the execution order or the posterior relationship of each step.

The "robot" or "virtual robot" as used herein mean hardware devices or software-configured virtual devices which perform commands under control and are not intended to limit specific types.

In this specification, the computing device means all kinds of hardware devices including at least one processor, and can be understood as including a software configuration which is operated in the corresponding hardware device according to the embodiment. For example, the computing device may be understood as a meaning including all of smart phones, tablet PCs, computers, and user clients and applications running on each device, but is not limited thereto.

Hereinafter, embodiments of the present inventive concept will be described with reference to the accompanying drawings.

Each step described in connection with FIGS. 1 to 8 is described as being performed by a computing device, but subjects of each step are not limited thereto, and according to embodiments, at least some of each steps can also be performed on different devices.

In the embodiments described below, the computing device includes a camera, photographs surrounding images using the a camera, and displays augmented reality images obtained by combining the photographed images with a virtual robot.

The computing device obtains a command for controlling a virtual robot according to a user input, controls the virtual robot according to the obtained command, and displays the control result.

The virtual robot operates by interacting with objects included in the photographed images and the virtual objects included in the augmented reality image according to the control, and the computing device provides feedback according to the interaction result.

FIG. 1 is a flowchart illustrating a coding training method using augmented reality according to an embodiment.

In step S101, the computing device performs a first step of obtaining coding training content.

In one embodiment, the computing device obtains the coding training content from a server via a network. In another embodiment, the computing device may obtain the coding training content stored in a memory, and may also generate the coding training content based on a predetermined rule.

In step S102, the computing device performs a second step of selecting one or more points included in the coding training content.

In one embodiment, the coding training content may be for creating a command which causes the virtual robot to interact with one or more real or virtual objects and to move.

For example, the coding training content may be for creating a command which causes the virtual robot to move to a specific path while avoiding one or more obstacles. In addition, the coding training content may be for creating a command which causes the virtual robot to catch and carry a specific object on a moving route.

Therefore, one or more points included in the coding training content means one or more objects to be interacted with the virtual robot. For example, one or more objects may be obstacles to be avoided by the virtual robot, objects to be carried by the virtual robot, or the like.

In step S103, the computing device performs a third step of obtaining an image photographed by a camera.

In step S104, the computing device recognizes the photographed image, and matches one or more points with one or more objects included in the photographed image.

For example, one or more objects may refer to a specific object included in the photographed image, and according to the embodiment, a specific position of a wall or a floor may be recognized as an object depending on the selection of the computing device.

The computing device matches each of the one or more points included in the coded training content with each of the one or more objects included in the photographed image. For example, a specific object included in the photographed image may be matched as an obstacle included in the coding training content, and a command may be created so that the virtual robot avoids the corresponding object.

Similarly, a command may be created so that the virtual robot picks up and moves the specific object included in the photographed image. In this case, since the virtual robot can not pick up and move a real object, the computing device may determine that the virtual robot catches the real object based on the movement of the virtual robot and a positional relationship between the virtual robot and the real object (specifically, the photographed real object which is displayed on a screen of the computing device), and may determine that the corresponding object moves along with the virtual robot based on the movement of the virtual robot. According to the embodiment, the computing device may remove a real object moving by the virtual robot from the screen, and display an image indicating that a real object or a virtual object corresponding to a point matched with the real object moves by the virtual robot, but the embodiment is not limited thereto.

A method for a computing device to determine a positional relationship between a virtual robot and a real object will be described in detail below.

In step S105, the computing device performs a fifth step of displaying the photographed image and the matched one or more points.

For example, the computing device displays the photographed image, and displays the point (or the virtual object corresponding to the point) included in the coding training content at a position where one or more objects recognized in the photographed image are photographed. The points matched with each object may be displayed instead of the object at the position of the real object, or may be displayed by overlapping with the object.

In step S106, the computing device performs a sixth step of displaying the virtual robot on the photographed image. A size and shape of the virtual robot are not limited. According to the embodiment, the virtual robot may include a tool for interacting with the virtual object (for example, a tong for catching and moving the virtual object, and the like).

In step S107, the computing device may perform a seventh step of displaying one or more command blocks each including one or more commands for controlling the movement of the virtual robot.

For example, each command block may include commands (for example, forward movement, backward movement, left turn, right turn, and the like) that cause the virtual robot to move in a particular direction.

In addition, each command block may include a command which cause the virtual robot to interact with the object (for example, an operation of catching an object, an operation of colliding with an object or avoiding an object, an operation of pushing an object, and the like).

In addition, each command block may include commands (for example, stopping, avoiding, or catching an object and the like, if the object is recognized) which are performed based on a particular condition.

In step S108, the computing device performs an eighth step of arranging the one or more command blocks at the one or more points based on the user input for the one or more command blocks displayed.

For example, the computing device may receive a touch input, which selects and drags and drops each of the one or more command blocks displayed, from a user via a touch screen device, and moves and display each command block to a position corresponding to the user input received. Each command block may move to each point according to a user's selection and may be arranged at the points, and each point is included in the coding training contents as described above and may be understood as meaning including points required for the virtual robot to change a direction or perform a specific command during the movement of the virtual robot.

For example, each point may mean can refer to an obstacle that a virtual robot should avoid, a path through which a virtual robot should pass, a door that a virtual robot should open and pass through, a wall gate to open and pass through, a wall where the virtual robot should change direction, and the like, and each point is matched with one or more objects included in an image photographed by a camera. For example, each point can be matched corresponding to an actual wall included in the image photographed by the camera, a specific position of a floor, an object located at the floor, and the like, and the command blocks may be arranged at each point according to the user input. When a plurality of command blocks are arranged at one point, the command blocks can be arranged in order, and the order can be changed according to the user input.

In step S109, the computing device performs a ninth step of controlling the virtual robot in the order in which the one or more command blocks are arranged, moving the virtual robot along the one or more points, and performing a command corresponding to the command block arranged at each point.

For example, the virtual robot moves along the points included in the coded training content, and performs a command corresponding to the command block arranged at each point when arriving each point.

For example, the virtual robot can turn right and go straight, and then turn left and go straight to avoid obstacles when the virtual robot arrives at a point where an obstacle is placed and the command blocks including a command to make a right turn at the corresponding point and go straight and a command to make a left turn at the corresponding point and go straight are arranged in order.

As another example, the virtual robot can catch an object disposed at a point and then go straight when command blocks including a command to catch an object arranged at a specific point and a command to go straight are arranged in order.

As another example, when a command block including a command to make a right turn and go straight without a virtual robot entering a path through which the virtual robot can go straight is arranged at a point corresponding to the path, the virtual robot can turn right and go straight without entering the corresponding path.

In step S110, the computing device performs a tenth step of displaying the movement of the virtual robot according to the control result. That is, the computing device displays the interaction with the movement of the virtual robot according to the above-described control.

Figure 2:
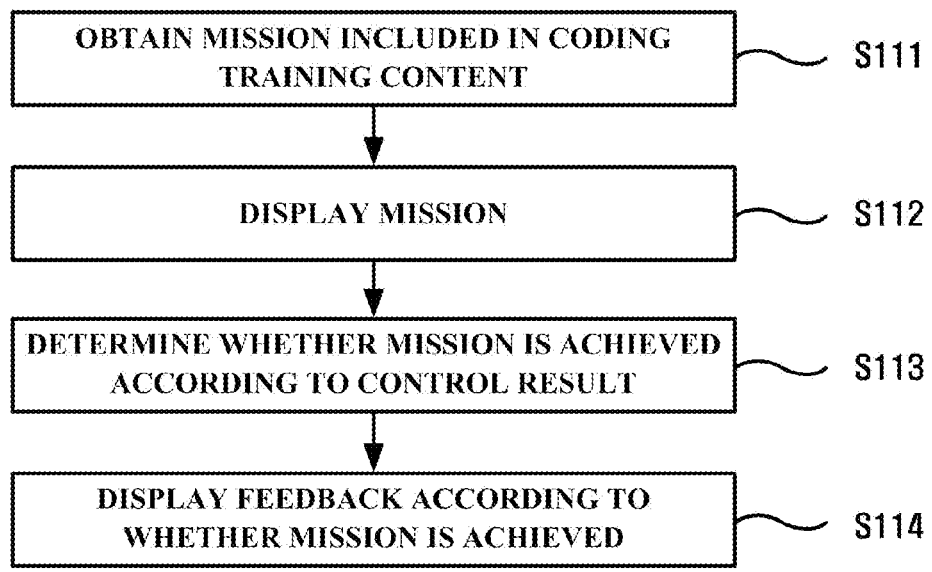
FIG. 2 is a diagram for describing in detail a method of obtaining coding training content according to an embodiment and a method of controlling a virtual robot corresponding thereto.

FIG. 2 is a diagram for describing in detail a method of obtaining coding training content according to an embodiment and a method of controlling a virtual robot corresponding thereto.

In the above-described step S101, the computing device performs an eleventh step (S111) of obtaining a mission included in the coding training content.

For example, the mission included in the coding training content may include, but not limited to, a mission to move a virtual robot from a specific position to another position, a mission to move a virtual robot along a specific path, a mission for the virtual robot to move a specific object, and the like.

Further, the computing device performs a twelfth step (S112) of displaying the mission.

In the above-described step S109, the computing device performs a thirteenth step (S113) of determining whether the mission is achieved according to the control result.

In one embodiment, each mission includes one or more points according to mission content, and the computing device may match each point with the photographed image and then may determine the interaction between the virtual robot and each point (that is, portions of the photographed image matched with each point) and determine whether the mission is achieved while the virtual robot moves within the photographed image through augmented reality.

In addition, the computing device performs a fourteenth step (S114) of displaying feedback according to whether the mission is achieved.

For example, the computing device may determine whether the mission is achieved after the operation of the virtual robot is completed, and generate and provide, based on the determination, feedback which includes whether the mission is achieved or where the mission fails and what the problem is when the mission fails.

In addition, the computing device can determine the movement of the virtual robot in real time, and can provide feedback by determining whether the virtual robot is following the mission or is out of the mission for each operation.

In one embodiment, the computing device may determine in advance the success of the mission based on the command blocks arranged at each point. In this case, the computing device may provide feedback requesting to change the arrangement of the command blocks.

Figure 3:
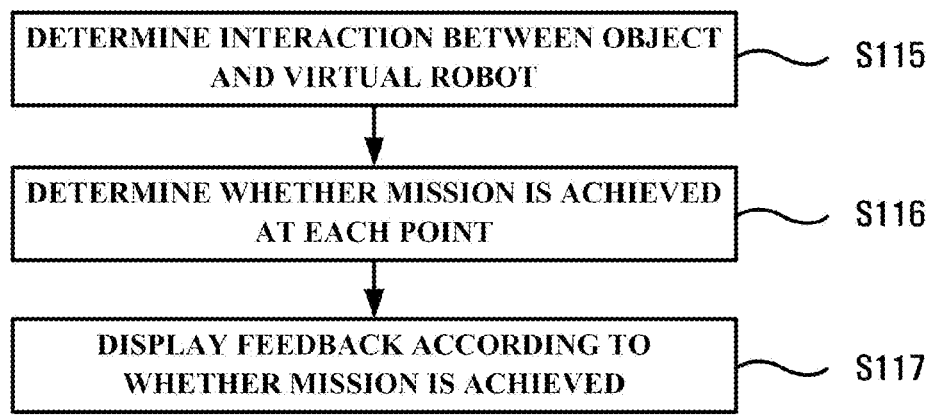
FIG. 3 is a flowchart illustrating in detail a method of determining whether or not a mission is achieved according to an embodiment of the present inventive concept.

FIG. 3 is a flowchart illustrating in detail a method of determining whether or not a mission is accomplished according to an embodiment of the present inventive concept.

In the above-described step S113, the computing device performs a fifteenth step (S115) of determining the interaction between the one or more objects and the virtual robot.

For example, the computing device can determine the interaction based on the positional relationship between the virtual image and the virtual robot corresponding to an object included in the photographed image or a point matched with the object.

In one embodiment, the virtual robot may include an ultrasonic sensor. In addition, a command corresponding to a distance sensed by the ultrasonic sensor may be arranged on the virtual robot. In this case, the computing device determines a distance and an angle between the object and the virtual robot, and calculates a virtual output of the ultrasonic sensor from the determined distance and angle. The computing device can control the virtual robot based on the calculated virtual output. In addition, the computing device can determine the interaction based on a contact point between the one or more object and the virtual robot, and a detailed method thereof will be described below.

In addition, the computing device performs a sixteenth step (S116) of determining whether or not the mission is achieved at each of the one or more points based on the interaction.

For example, according to the coding training content, a mission may be assigned to a virtual robot so that the virtual robot avoids a specific point without colliding with the corresponding point, and the computing device may arrange command blocks which causes the virtual robot to avoid the corresponding point by changing the direction of the virtual robot in response to the mission before arriving at the corresponding point. In this case, the virtual robot will avoid the corresponding point without colliding with the corresponding point by the control of the computing device, and the computing device can determine that the mission of the corresponding point has been achieved.

In addition, in the above-described step S114, the computing device performs a seventeenth step (S117) of displaying the feedback according to whether or not the mission is achieved at each of the one or more points.

For example, the computing device may provide feedback on whether a mission is accomplished by differently expressing colors and the like of the corresponding point when the mission at each point is achieved, but the present embodiment is not limited thereto.

Figure 4:
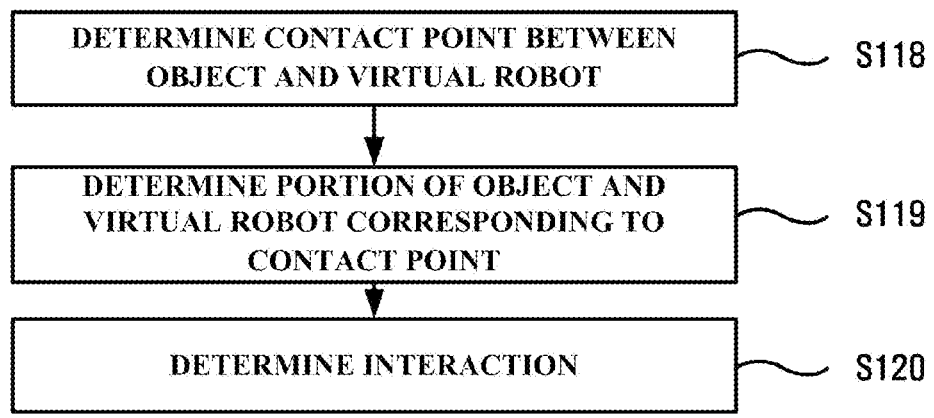
FIG. 4 is a flowchart illustrating a method of determining an interaction according to an embodiment.

FIG. 4 is a flowchart illustrating a method of determining an interaction according to an embodiment.

In the above-described step S115, the computing device performs an eighteenth step (S118) of determining one or more contact point between the one or more objects and the virtual robot.

For example, the computing device analyzes the augmented reality image to determine the contact point between one or more objects and the virtual robot. For example, the contact point may refer to a portion where the object and the virtual robot contact or overlap each other in the augmented reality image.

In addition, the computing device performs a nineteenth step (S119) of determining the portions of the one or more objects and the virtual robot corresponding to each of the one or more contact points.

For example, for each of the one or more contact points, the computing device can determine which portion of the object and the virtual robot the corresponding contact point corresponds to. For example, if the object is a box which should be carried by the virtual robot, the contact point may correspond to a part of the box and a part of a tong of the virtual robot used to carry the box.

In addition, the computing device performs a twentieth operation (S120) of determining the interaction based on the positions and the movement of the one or more contact points, and the portions corresponding to each of the one or more contact points.

For example, when the first contact point and the second contact point are determined, the first contact point may correspond to one point of the object box, and the second contact point may correspond to another point. Similarly, the first contact point may correspond to one part of the tong which is included in the virtual robot, and the second contact point may correspond to another portion of the tong. In this case, the computing device can determine that the virtual robot has picked up the box to be carried using the tong. In this state, when the positions of the first contact point and the second contact point move, the computing device can determine that the virtual robot lifts or picks up and moves the object box according to the movement direction of the contact point.

Figure 5:
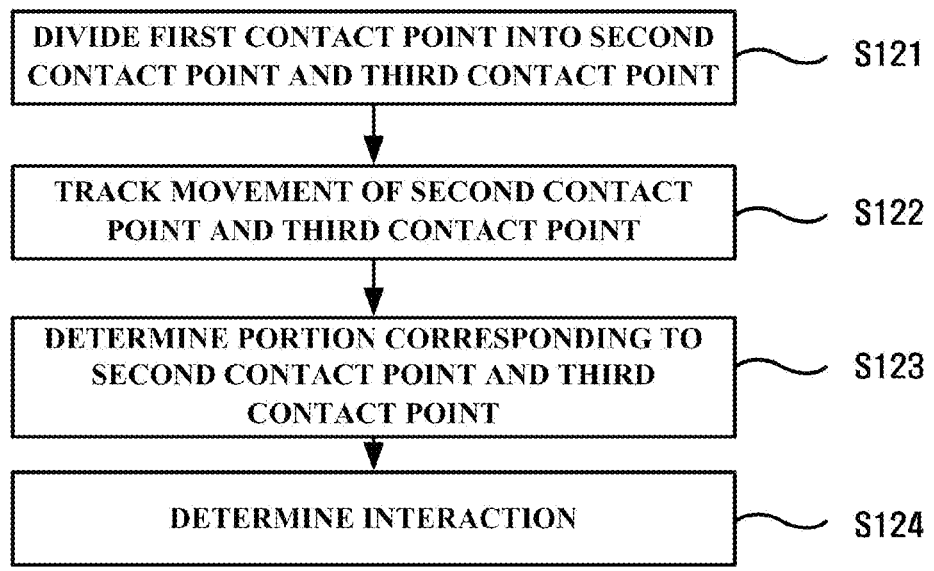
FIG. 5 is a flowchart illustrating in detail a method of determining a contact point and an interaction according to an embodiment.

FIG. 5 is a flowchart illustrating in detail a method of determining a contact point and an interaction according to an embodiment.

In the above-described step S120, the computing device performs the twenty-first step (S121) of dividing a first contact point included in the one or more contact points into a second contact point and a third contact point.

For example, even when one contact point is determined, the computing device may divide the corresponding contact point into two or more contact points in advance, and determine that each contact point is at the same position.

In addition, the computing device performs the twenty-second step (S122) of tracking the movement of the second contact point and the third contact point.

In addition, when a distance between the second contact point and the third contact point is greater than a predetermined reference value, the computing device performs a thirtieth-third step (S123) of determining the portion of the one or more objects and the virtual robot corresponding to each of the second contact point and the third contact point.

In one embodiment, the portion of the object or the virtual robot corresponding to the contact point may be separated from each other and away from each other. For example, the object can be separated into two or more. There may be an embodiment in which blocks in which the object can be separated are stacked, blocks are cut by the interaction with the virtual robot, or the like. Further, the tong of the virtual robot can be switched from the closed state to the opened state. In this case, when a tip of the tong corresponds to the contact point, the contact point can be separated into two or more as the tong is opened.

In addition, the computing device performs a twenty-fourth step (S124) of determining the interaction based on the positions and movement of the second contact point and the third contact point, and the portions corresponding to each of the second contact point and the third contact point.

When the contact point is divided into two or more, the computing device can determine the interaction between the object and the virtual robot by re-determining the portions of the object and the virtual robot corresponding to each of the divided contact points.

In one embodiment, the object and the virtual robot may be in contact point with each other and away from each other. In this case, the existing contact point can be separated into the object-side contact point and the virtual robot-side contact point, and the computing device can determine the interaction between the object and the virtual robot by re-determining the object and the portion corresponding to each contact point.

That is, the computing device can determine the interaction between the virtual robot and the object by determining the generation of the contact point, and then tracking the operation of the contact point which disappears or is separated into two or more.

Figure 6:
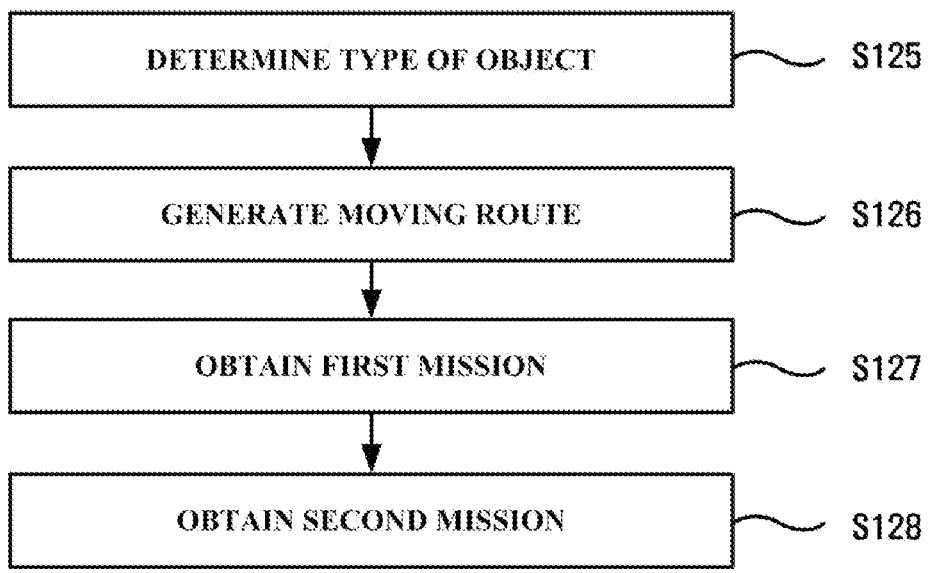
FIG. 6 is a flowchart illustrating an example of obtaining a mission.

FIG. 6 is a flowchart illustrating an example of obtaining a mission.

In the above-described step S111, the computing device performs a twenty-fifth step (S125) of determining the type of the one or more objects.

For example, the computing device can determine whether each object is an object to be carried by a virtual robot, an object that a virtual robot should avoid, an object by which a virtual robot can pass, and the like.

In addition, the computing device performs a twenty-sixth step (S126) of generating a movement path of the virtual robot based on the position and type of the one or more objects included in the photographed image.

For example, the computing device may generate a path through which a virtual robot should move based on a result of determining the type of each object, and the path may include, but not limited to, an optimal path or a range of a path through which the virtual robot can move, and the like.

In addition, the computing device performs a twentieth-seventh step (S127) of obtaining a first mission which causes the virtual robot to move along the movement path.

The range of the moving route can be set differently according to the degree of difficulty, the mission which causes the virtual robot to move within a predetermined range may be obtained, and when the moving route of the virtual robot is topologically analyzed to be determined as a moving route of the same range, a mission which determines that the mission is achieved may be obtained.

In addition, the computing device performs a twentieth-eighth step (S128) of obtaining a second mission which causes the virtual robot to perform a predetermined interaction with at least one of the one or more objects.

For example, the mission may include, but is not limited to, a mission which causes the virtual robot to avoid, collide with, or carry a particular object.

Figure 7:
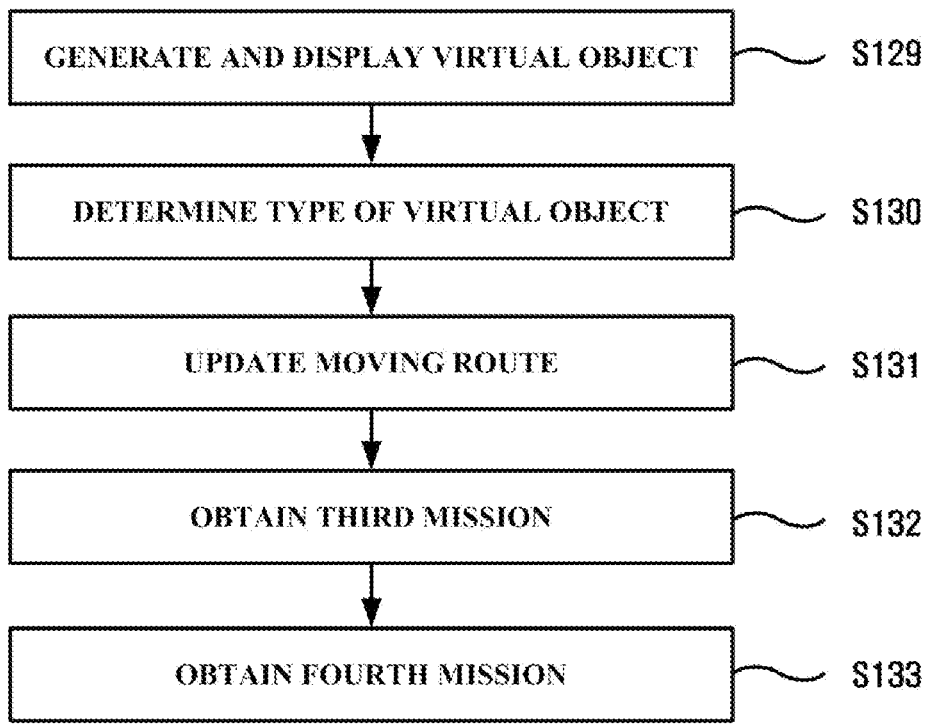
FIG. 7 is a flowchart illustrating an example of obtaining a mission based on a virtual object.

FIG. 7 is a flowchart illustrating an example of obtaining a mission based on a virtual object.

In the above-described step S113, the computing device performs a twentieth-ninth step (S129) of generating and displaying the one or more virtual objects on the moving route.

For example, the virtual object is an object not included in the photographed image, and may be displayed at one point of the photographed image using the augmented reality.

In addition, the computing device performs a thirtieth step (S130) of determining the type of the one or more virtual objects.

For example, the type of the virtual objects may include, but is not limited to, an object that a virtual robot should carry, an object that a virtual robot should avoid, an object which a virtual robot can pass by, and the like.

In addition, the computing device performs a thirtieth-first step (S131) of updating the moving route based on the positions and the type of the one or more virtual objects.

For example, when an added virtual object is an obstacle that a virtual robot should avoid, the moving route may be updated so that the virtual robot can move avoiding the obstacle.

In addition, the computing device performs a thirtieth-second step (S132) of obtaining a third mission which causes the virtual robot to move along the updated moving route.

In addition, the computing device performs a thirtieth-third step (S133) of obtaining a fourth mission which causes the virtual robot to perform a predetermined interaction with at least one of the one or more objects.

For example, a fourth mission can include a mission or the like which causes a virtual robot to carry a virtual object, create a particular shape using a plurality of virtual objects, or stack the plurality of virtual objects such as blocks.

Figure 8:
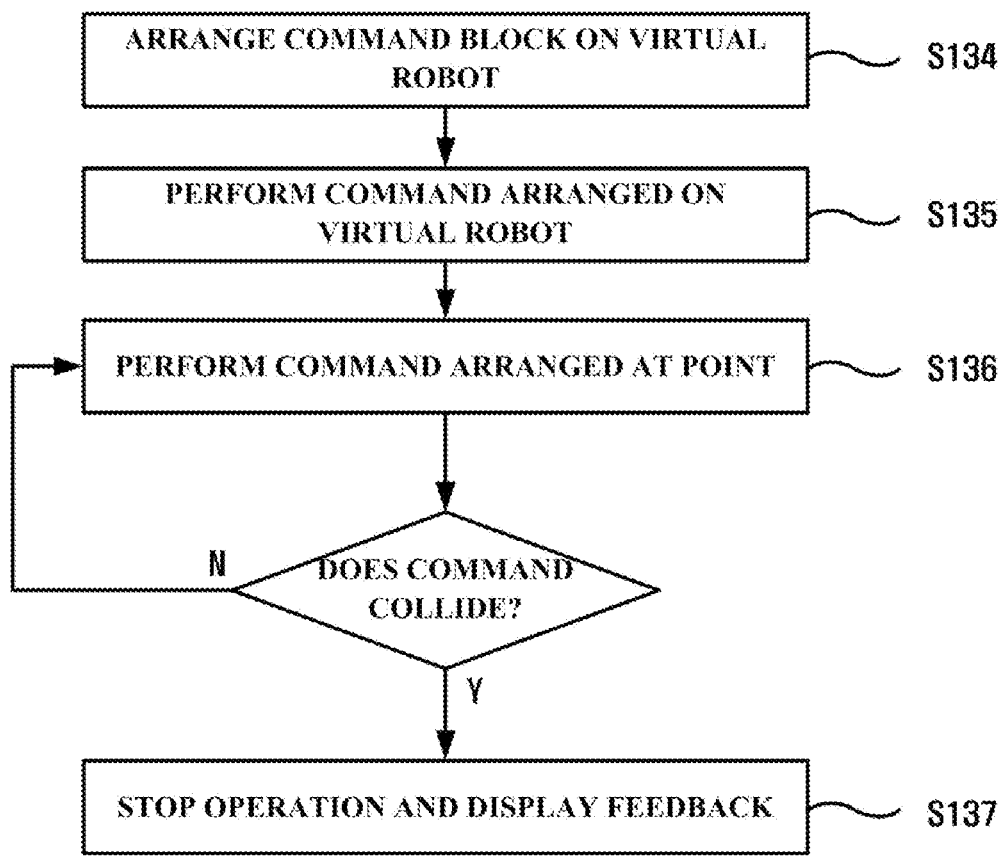
FIG. 8 is a flowchart illustrating a method of arranging a command block according to an embodiment.

FIG. 8 is a flowchart illustrating a method of arranging a command block according to an embodiment.

In the above-described step S108, the computing device performs a thirtieth-fourth step 34 (S134) of arranging at least some of the one or more command blocks on the virtual robot.

In the one embodiment, the computing device can not only arrange at least some of the command blocks at points acquired from the coding training content based on the user input, but also arrange at least some of the command blocks on the virtual robot. That is, when a drag and drop input to a plurality of command commands is received from a user, the plurality of command commands is arranged at a position where the virtual robot is disposed according to the drag and drop input, and the plurality of command commands are arranged on the virtual robot, the command blocks may be arranged in order. The order in which the command blocks are arranged may be changed according to the user input.

For example, the command blocks arranged on the virtual robot may include an operation of performing the virtual robot independent of the point and operations of using virtual sensor equipment which causes the virtual robot to recognize and operate each object or point.

For example, the command blocks arranged on the virtual robot may include a command which causes the virtual robot to go straight and a command which causes the virtual robot to be stopped once when an obstacle is recognized.

In the above-described step S109, the computing device performs a thirtieth-fifth step (S135), which performs a command corresponding to the command block arranged on the virtual robot.

In addition, the computing device performs a thirtieth-sixth step (S136) of performing command corresponding to the command block arranged at the arriving point when arriving at the one or more points.

For example, the virtual robot may basically go straight in accordance with the command blocks arranged on the virtual robot and then may be stopped once when an obstacle is detected.

Thereafter, the operation of lifting or avoiding the corresponding obstacle may be performed according to the command blocks arranged at the point corresponding to the corresponding obstacle.

In addition, the computing device performs a thirtieth-seventh step (S137) of stopping an operation and displaying feedback when a conflict between command corresponding to the command block arranged on the virtual robot collide with the command corresponding to the command block arranged at the arriving point.

For example, when a command block arranged on a virtual robot includes a command which causes the virtual robot to collide with an obstacle when the virtual robot encounters an obstacle, and a collision occurs when the command block arranged at a point corresponding to the obstacle includes a command which causes the virtual robot to avoid an obstacle. In this case, in order to prevent the error, the computing device may stop the operation of the virtual robot and display the feedback.

In addition, the order of priority of the command blocks may be set according to the embodiment. For example, when the command corresponding to the command block arranged on the virtual robot collides with the commands corresponding to the command block arranged on each point, the command corresponding to the command block arranged on the virtual robot can be set to take precedence, or vice versa.

Also, the priority may be set differently (for example, the command which avoids an obstacle may take precedence over the command which collides with the obstacle) according to the type of commands, and the priority may be set for each command block. For example, each command block can be numbered sequentially, and when different command blocks collide, it is possible to follow a command of a higher numbered command block.

In one example, when the operation of the virtual robot is stopped and the feedback is displayed according to step S137, one of the colliding command blocks is selected according to the user's selection, and the virtual robot may be controlled according to the selected command block.

In addition, a user can also perform debugging and change the arrangement of the command blocks when the operation of the virtual robot is stopped.

Figure 9:
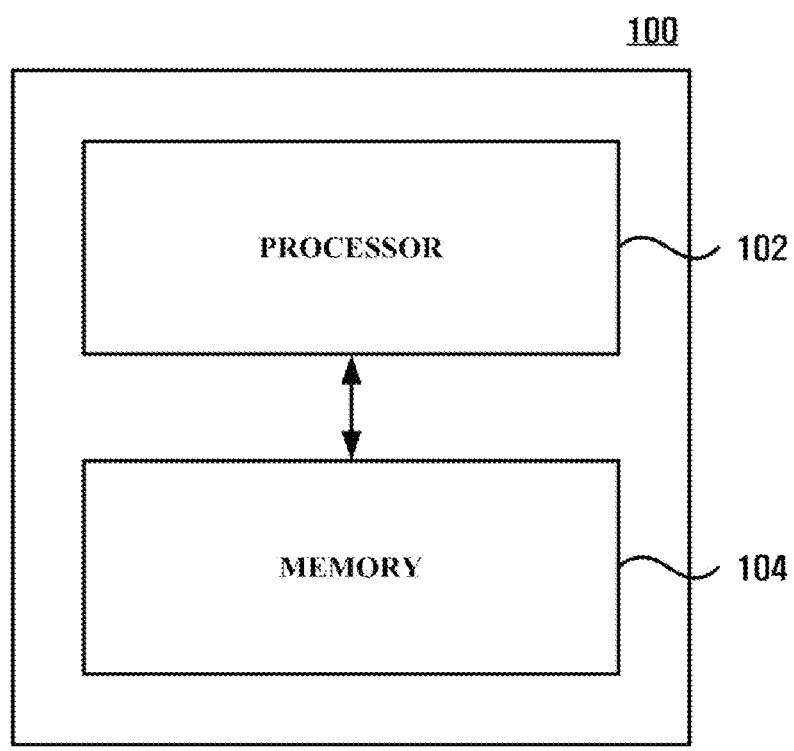
FIG. 9 is a configuration diagram of a computing apparatus according to an embodiment.

FIG. 9 is a configuration diagram of a computing apparatus according to an embodiment.

A processor 102 may include one or more cores (not illustrated) and a connection path (for example, a bus and the like) through which signals are transmitted and received to and from a graphics processing unit (not illustrated) and/or other components.

The processor 102 according to one embodiment performs the method described with reference to FIGS. 1 to 8 by executing one or more instructions stored in a memory 104.

For example, the method includes: a first step of obtaining coding training content by executing one or more instruction stored in a memory; a second step of selecting one or more points included in the coding training content; a third step of obtaining an image photographed by the camera; a fourth step of recognizing the photographed image and matching one or more objects included in the photographed image with the one or more points; a fifth step of displaying the photographed image and the matched one or more points; a sixth step of displaying a virtual robot on the photographed image; a seventh step of displaying one or more command blocks each including one or more commands for controlling a movement of the virtual robot; an eighth step of arranging the one or more instruction blocks at the one or more points based on a user input for the one or more command blocks displayed; a ninth step of controlling the virtual robot in order in which the one or more command blocks are arranged, moving the virtual robot along the one or more points, and performing commands corresponding to the command blocks arranged at each point; and a tenth step of displaying the movement of the virtual robot according the control result.

Meanwhile, the processor 102 may further include a random access memory (RAM) (not illustrated) and a read-only memory (ROM) for temporarily and/or permanently storing signals (or data) processed in the processor 102. In addition, the processor 102 may be implemented in a form of a system-on-chip (SoC) including at least one of the graphics processing unit, the RAM, and the ROM.

The memory 104 may store programs (one or more instructions) for processing and control of the processor 102. The programs stored in the memory 104 may be divided into a plurality of modules according to functions.

Steps of the method or algorithm described with reference to the embodiment of the present inventive concept may be directly implemented in hardware, in software modules executed by hardware, or in a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or in any form of computer readable recording medium known in the art to which the invention pertains.

The components of the present inventive concept may be embodied as a program (or application) and stored in a medium for execution in combination with a computer which is hardware. The components of the present inventive concept may be executed in software programming or software elements, and similarly, embodiments may in programming or scripting language such as C, C++, Java, and assembler, including various algorithms implemented in a combination of data structures, processes, routines, or other programming constructions. Functional aspects may be implemented in algorithms executed on one or more processors, Although the embodiments of the present inventive concept has been described with reference to the accompanying drawings, those skilled in the art will appreciate that various modifications and alterations may be made without departing from the spirit or essential feature of the present inventive concept. Therefore, it should be understood that the above-mentioned embodiments are not restrictive but are exemplary in all aspects.

According to the disclosed embodiments, it is possible to provide the coding training using a virtual robot without an actual robot by using the augmented reality.

Effects of the present inventive concept are not limited to the above-mentioned effects, and other effects that are not mentioned will be clearly understood by those skilled in the art from the following descriptions.

What is claimed is:

1. A coding training method using augmented reality as a method performed by a computing device including a camera, the coding training method comprising:
   a first step of obtaining coding training content;
   a second step of selecting one or more points included in the coding training content;
   a third step of obtaining an image photographed by the camera;
   a fourth step of recognizing the photographed image and matching one or more objects included in the photographed image with the one or more points;
   a fifth step of displaying an image and the matched one or more points;
   a sixth step of displaying a virtual robot on the photographed image;
   a seventh step of displaying one or more instruction blocks each including one or more instructions for controlling a movement of the virtual robot;
   an eighth step of arranging the one or more instruction blocks at the one or more points based on user input for the one or more instruction blocks displayed;
   a ninth step of controlling the virtual robot in order in which the one or more instruction blocks are arranged, moving the virtual robot along the one or more points, and performing instructions corresponding to the instruction blocks arranged at each point; and
   a tenth step of displaying the movement of the virtual robot according to the controlling of the virtual robot;
   wherein the first step includes:
   an eleventh step of obtaining a mission included in the coding training content; and
   a twelfth step of displaying the mission, and
   the ninth step includes:
   a thirteenth step of determining whether or not the mission is achieved according to the controlling of the virtual robot; and
   a fourteenth step of displaying feedback according to whether or not the mission is achieved;
   wherein the thirteenth step includes:
   a fifteenth step of determining an interaction between the one or more object and the virtual robot; and
   a sixteenth step of determination whether or not the mission is achieved at each of the one or more points based on the interaction, and
   the fourteenth step includes:
   a seventeenth step of displaying the feedback according to whether or not the mission is achieved at each of the one or more points;
   wherein the fifteenth step includes:

an eighteenth step of determining one or more contact points between the one or more object and the virtual robot;
a nineteenth step of determining portions of the one or more objects and the virtual robot corresponding to each of the one or more contact points; and
a twentieth step of determining the interaction based on positions and movement of the one or more contact points and the portions corresponding to each of the one or more contact points.

2. The coding training method using augmented reality of claim 1, wherein the twentieth step include:
a twenty-first step of dividing a first contact point included in the one or more contact point into a second contact point and a third contact point;
a twenty-second step of tracking movement of the second contact point and the third contact point;
a twenty-third step of determining the portions of the one or more objects and the virtual robot corresponding to the second contact point and the third contact point, respectively, when a distance between the second contact point and the third contact point is greater than a predetermined reference value; and
a twenty-fourth step of determining the interaction based on the positions and the movement of the second contact point and the third contact point and the portions corresponding to the second contact point and the third contact point, respectively.

3. The coding training method using augmented reality of claim 1, wherein the eleventh step includes:
a twenty-fifth step of determining a type of the one or more objects;
a twenty-sixth step of generating a moving route of the virtual robot based on the positions and the type of the one or more objects included in the photographed image;
a twenty-seventh step of obtaining a first mission which causes the virtual robot to move along the moving route; and
a twenty-eighth step of obtaining a second mission which causes the virtual robot to perform at least one of the one or more objects with a predetermined interaction.

4. The coding training method using augmented reality of claim 3, wherein the eleventh step includes:
a twenty-ninth of generating and displaying one or more virtual objects on the moving route;
a thirtieth step of determining a type of the one or more virtual objects;
a thirtieth-first step of updating the moving route based on the position and type of the one or more virtual objects;
a thirtieth-two of obtaining a third mission which causes the virtual robot to move along the updated moving route; and
a thirtieth-third step of obtaining a fourth mission which causes the virtual robot to perform a predetermined interaction with at least one of the one or more virtual objects.

5. The coding training method using augmented reality of claim 1, wherein the eighth step further includes:
a thirtieth-fourth step of arranging at least a part of one or more command blocks in the virtual robot, and
the ninth step further includes:
a thirtieth-fifth step of performing a first command corresponding to the command block arranged on the virtual robot;
a thirtieth-sixth step of performing a second command corresponding to the command block arranged at a reached point when the virtual robot reaches the one or more points;
a thirtieth-seventh of stopping an operation of the virtual robot and displaying the feedback when the first command corresponding to the command block arranged on the virtual robot collide with the second command corresponding to the command block arranged at the reached point.

* * * * *